(12) United States Patent
Hook et al.

(10) Patent No.: US 8,451,121 B2
(45) Date of Patent: May 28, 2013

(54) CALIBRATION AND OPERATIONAL ASSURANCE METHOD AND APPARATUS FOR RFID OBJECT MONITORING SYSTEM

(75) Inventors: Christopher Derek Hook, Lake Barrington, IL (US); Graham P. Bloy, St. Louis, MO (US); Thomas Ellinwood, St. Louis, MO (US); Christopher Gordon Gervase Turner, Oakley (GB)

(73) Assignee: PF Controls, LLC, St. Louis, MO (US)

( * ) Notice: Subject to any disclaimer, the term of this patent is extended or adjusted under 35 U.S.C. 154(b) by 0 days.

(21) Appl. No.: 12/878,463

(22) Filed: Sep. 9, 2010

(65) Prior Publication Data

US 2011/0063113 A1 Mar. 17, 2011

Related U.S. Application Data

(60) Provisional application No. 61/241,194, filed on Sep. 10, 2009.

(51) Int. Cl.
*G08B 23/00* (2006.01)

(52) U.S. Cl.
USPC ............... 340/572.1; 340/5.2; 340/539.13; 340/539.23; 340/686.6

(58) Field of Classification Search
USPC .......... 340/539.13, 539.23, 5.2, 572.1–572.9
See application file for complete search history.

(56) References Cited

U.S. PATENT DOCUMENTS

| | | | |
|---|---|---|---|
| 5,402,132 A | 3/1995 | Hall et al. |
| 5,686,928 A | 11/1997 | Pritchett et al. |
| 6,480,108 B2 | 11/2002 | McDonald |
| 6,753,782 B2 | 6/2004 | Power |
| 6,784,842 B2 | 8/2004 | Vesuna |
| 6,989,741 B2 | 1/2006 | Kenny et al. |
| 7,002,461 B2 | 2/2006 | Duncan et al. |
| 7,030,761 B2 | 4/2006 | Bridgelall et al. |
| 7,061,366 B2 | 6/2006 | Bell et al. |
| 7,098,794 B2 | 8/2006 | Lindsay et al. |
| 7,119,687 B2 | 10/2006 | Paulsen et al. |
| 7,119,738 B2 | 10/2006 | Bridgelall et al. |
| 7,138,914 B2 | 11/2006 | Culpepper et al. |
| 7,151,454 B2 | 12/2006 | Washington |
| 7,154,395 B2 | 12/2006 | Raskar et al. |

(Continued)

FOREIGN PATENT DOCUMENTS

| | | |
|---|---|---|
| JP | 2008-009533 | 1/2008 |
| WO | 2009/035723 | 3/2009 |

OTHER PUBLICATIONS

International Search Report for PCT Application No. PCT/IB/53643; ISA/US, mailed on Mar. 30, 2009.

(Continued)

*Primary Examiner* — Tai T Nguyen
*Assistant Examiner* — Ojiako Nwugo
(74) *Attorney, Agent, or Firm* — Babcock IP, PLLC

(57) ABSTRACT

A method for monitoring objects in a three dimensional target area and or business process decision making. The methods include calibration, recalibration, operation and rules compliance for a radio frequency object monitoring system. Location tags are placed throughout a three dimensional area in predetermined positions and used to determine relative position, movement and or distances of objects with and without object tags. Repeated scanning and comparison of data provides a database by which the object monitoring system responds according to predetermined rules.

2 Claims, 8 Drawing Sheets

U.S. PATENT DOCUMENTS

| | | | |
|---|---|---|---|
| 7,170,412 B2 | 1/2007 | Knox et al. | |
| 7,183,922 B2 | 2/2007 | Mendolia et al. | |
| 7,183,933 B2 | 2/2007 | Dzurko et al. | |
| 7,187,288 B2 | 3/2007 | Mendolia et al. | |
| 7,199,712 B2 | 4/2007 | Tafas et al. | |
| 7,199,719 B2 | 4/2007 | Steinberg | |
| 7,221,269 B2 | 5/2007 | Onderko et al. | |
| 7,511,662 B2 | 3/2009 | Mathews et al. | |
| 2001/0038318 A1 | 11/2001 | Johnson et al. | |
| 2004/0102869 A1 | 5/2004 | Andersen et al. | |
| 2004/0102870 A1 | 5/2004 | Andersen et al. | |
| 2004/0124977 A1* | 7/2004 | Biffar | 340/539.13 |
| 2004/0227682 A1 | 11/2004 | Anderson | |
| 2004/0233461 A1 | 11/2004 | Armstrong et al. | |
| 2005/0012613 A1 | 1/2005 | Eckstein et al. | |
| 2005/0035862 A1 | 2/2005 | Wildman et al. | |
| 2005/0146464 A1 | 7/2005 | Zegelin et al. | |
| 2005/0230604 A1* | 10/2005 | Rowe et al. | 250/221 |
| 2005/0258956 A1 | 11/2005 | Neuwirth | |
| 2006/0012521 A1 | 1/2006 | Small | |
| 2006/0019679 A1 | 1/2006 | Rappaport et al. | |
| 2006/0022800 A1 | 2/2006 | Krishna et al. | |
| 2006/0050625 A1 | 3/2006 | Krasner | |
| 2006/0132304 A1* | 6/2006 | Cabell | 340/539.23 |
| 2006/0187043 A1 | 8/2006 | Allen | |
| 2006/0214792 A1 | 9/2006 | Goyal et al. | |
| 2006/0232467 A1 | 10/2006 | Small | |
| 2006/0267731 A1 | 11/2006 | Chen | |
| 2007/0013516 A1 | 1/2007 | Freitag et al. | |
| 2007/0013521 A1 | 1/2007 | Lindsay et al. | |
| 2007/0018820 A1 | 1/2007 | Chand et al. | |
| 2007/0040739 A1 | 2/2007 | Small | |
| 2007/0041427 A1 | 2/2007 | Small | |
| 2007/0075864 A1 | 4/2007 | Culpepper et al. | |
| 2007/0087756 A1 | 4/2007 | Hoffberg | |
| 2007/0096909 A1 | 5/2007 | Lally | |
| 2007/0097211 A1 | 5/2007 | Washington | |
| 2007/0100548 A1 | 5/2007 | Small | |
| 2007/0103303 A1 | 5/2007 | Shoarinejad | |
| 2007/0103313 A1 | 5/2007 | Washington | |
| 2007/0120671 A1 | 5/2007 | Carmichael et al. | |
| 2007/0120736 A1 | 5/2007 | MacKenzie et al. | |
| 2007/0141997 A1 | 6/2007 | Wulff et al. | |
| 2007/0150129 A1 | 6/2007 | Davenport | |
| 2007/0152829 A1 | 7/2007 | Lindsay et al. | |
| 2009/0174549 A1 | 7/2009 | Park et al. | |
| 2009/0212921 A1 | 8/2009 | Wild et al. | |
| 2009/0224045 A1 | 9/2009 | Toda et al. | |
| 2009/0224873 A1 | 9/2009 | Puskala et al. | |
| 2009/0231140 A1 | 9/2009 | Hong et al. | |
| 2009/0237253 A1 | 9/2009 | Neuwirth | |
| 2009/0256750 A1 | 10/2009 | Mathews et al. | |

OTHER PUBLICATIONS

European search report for counterpart application No. 10001521.3-2220; mailed on Jun. 29, 2010.

International Search Report for PCT Application No. PCT/US08/58824; ISA/US, mailed on Jun. 26, 2008.

Chang Ju Kim, International Search Report and Written Opinion, PCT International Application serial No. PCT/US2010/048220, 9 pages, Daejeon, Republic of Korea, May 31, 2011.

* cited by examiner

CALIBRATION AND OPERATIONAL ASSURANCE METHOD AND APPARATUS FOR RFID OBJECT MONITORING SYSTEM

CROSS REFERENCE TO RELATED APPLICATIONS

This application claims the benefit of U.S. Provisional Patent Application No. 61/241,194, titled "Calibration and Operational Assurance Method and Apparatus for RFID Object Monitoring Systems", filed by Christopher D. Hook, Graham P. Bloy, Thomas Elinwood and Christopher G. G. Turner on Sep. 10, 2009 hereby incorporated by reference in its entirety.

BACKGROUND

1. Field of the Invention

The invention relates to touch free identification, location and/or tracking systems such as systems applying RFID tag technologies to achieve identification, location and tracking of objects and items to which RFID tags are attached and/or associated. More particularly, the invention utilizes historical and/or pre-configured data of the location and status of objects, for example via location of associated RFID tags attached to either fixed or movable objects or to both objects or items in a space, to improve the utility, accuracy and performance of the identification, location and/or tracking systems.

2. Description of Related Art

Previous RFID tag inventory and/or object passage gateway monitoring systems have generally relied upon reading one or a plurality of tags, each tag representing a unit or known quantity of units of associated objects. It may not be practical to apply an RFID tag to each object to be monitored, and/or it is desirable to monitor the presence of quantities of the objects to be monitored with greater precision than just a binary indication of an RFID tag associated with a quantity of objects each of which may or may not be tagged, as might be the case with items contained in a parts bin.

RFID tags are attached and/or associated. More particularly, the invention utilizes historical and/or pre-configured data of the location and status of objects, for example via location of associated RFID tags attached to either fixed or movable objects or to both objects or items in a space, to improve the utility, accuracy and performance of the identification, location and/or tracking systems.

DESCRIPTION OF RELATED ART

Previous RFID tag inventory and/or object passage gateway monitoring systems have generally relied upon reading one or a plurality of tags, each tag representing a unit or known quantity of units of associated objects. It may not be practical to apply an RFID tag to each object to be monitored, and/or it is desirable to monitor the presence of quantities of the objects to be monitored with greater precision than just a binary indication of an RFID tag associated with a quantity of objects each of which may or may not be tagged, as might be the case with items contained in a parts bin.

RFID tags are attached and/or associated. More particularly, the invention utilizes historical and/or pre-configured data of the location and status of objects, for example via location of associated RFID tags attached to either fixed or movable objects or to both objects or items in a space, to improve the utility, accuracy and performance of the identification, location and/or tracking systems.

DESCRIPTION OF RELATED ART

Previous RFID tag inventory and/or object passage gateway monitoring systems have generally relied upon reading one or a plurality of tags, each tag representing a unit or known quantity of units of associated objects. It may not be practical to apply an RFID tag to each object to be monitored, and/or it is desirable to monitor the presence of quantities of the objects to be monitored with greater precision than just a binary indication of an RFID tag associated with a quantity of objects each of which may or may not be tagged, as might be the case with items contained in a parts bin.

In prior RFID portal systems, RFID readers monitor RFID tags attached to objects and/or object loads during passage through defined gateways, such as a number of dock doors in a distribution center. Because of the nature of known RFID systems it is not always cost efficient to provide a system capable of determining whether particular tags are in a particular door, without extensive and cost intensive modification, such as application of RF shielding and/or duplicated narrow beam antenna configurations, it is possible for example for a reader associated with one door to read a tag in adjacent doors. Without dedicated door sensors combined with tag motion detection, it is not possible to determine whether a particular door is open or closed and whether an object is moving out of the distribution center or into the distribution center.

Further, many items have packaging that is not complementary to being tagged and/or is not "RF friendly", such as metal cans and/or plastic bottles. Also, it may not be economical to tag individual items, such as nails, bolts, batteries, coins or the like. To optimize inventory operations, for example for Just In Time inventory systems, it is desirable to know the rate of depletion and/or when inventory of a specific item is about to be depleted, before actual depletion occurs.

Commonly owned PCT Patent Application Publication WO 2009/035723, titled "Radio Frequency Signal Acquisition and Source Location System" by Bloy et al published Mar. 19, 2009, hereby incorporated by reference in its entirety, discloses a real-time RFID technology location system that utilizes an Intelligent Tracking and Control System (ITCS) coupled to one or more intelligent antenna Signal Acquisition and Source Location (SASL) modules (an ITCS installation) to enable the accurate 3-dimensional location of passive RFID tags arbitrarily placed and/or moving through a defined target area. Identification, location and/or tracking systems such as the ITCS object identification systems described in WO 2009/035723 enable the identification and location of tags and/or tagged items, attributing significance to the appearance, disappearance, location or co-location of tags or tagged items and thereby facilitating better business process decisions.

Commonly owned U.S. patent application Ser. No. 12/395,595 titled "Radio Frequency Environment Object Monitoring System and Methods of Use" by Bloy et al filed Feb. 27, 2009, hereby incorporated by reference in its entirety, discloses methods and apparatus for collecting and comparing instances of an ITCS installation target area RF environment to determine the presence and/or movement of tagged and/or un-tagged objects in the target area.

Therefore, it is an object of the invention to provide an object monitoring solution that overcomes deficiencies in the prior art. A further object of the present invention is to facilitate ease of configuration, operation reliability and maintenance of an ITCS installation and/or other RFID technology object location system installations.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Studying the operational parameters of object location systems, the inventors have identified among others, three significant problems in the art of high performance passive UHF RFID systems and for which hitherto there have not been solutions. The problems are; a) how to maintain maximal operating range over the long term, b) how to ensure the stability or long term accuracy of tag location attributes of the system and c) how to overcome the variations in the RF environment resulting from normal business operations. It has been observed that the location accuracy of a passive RFID tag object location system such as ITCS, suffers over time due to a number of factors, one of which is the change in the RF environment and the other is the mechanical changes to the installation which affect the location signal propagation and/or the alignment accuracy of SASL antenna. The solutions described herein overcome these concerns and provide a means to dynamically and adaptively alter the system to correct for such changes and alternatively raise an alarm when the self-adapting system is out of self-adjustment range.

A desirable characteristic of an automatic data capture system is that it should be capable of self-monitoring the target area in which it is installed to record reference data pertaining to the locations of tags affixed to fixed items. Such tags, while having substantially the same technical characteristics as tags attached to items for identification and location, are given special significance as "location tags". Hence, through mechanisms described herein, ITCS may monitor its environment for unanticipated changes that, if undetected, might adversely affect the performance or operation of the system.

Applying the methods herein, the inventors have determined that it is possible to use a number of static "location tags" that are attached to non-movable objects in the environment and the scanning capabilities of an object monitoring system such as an ITCS to reduce the complexity and cost of instrumentation, and at the same time address the latent business process decision making issues described herein.

Figure 1:
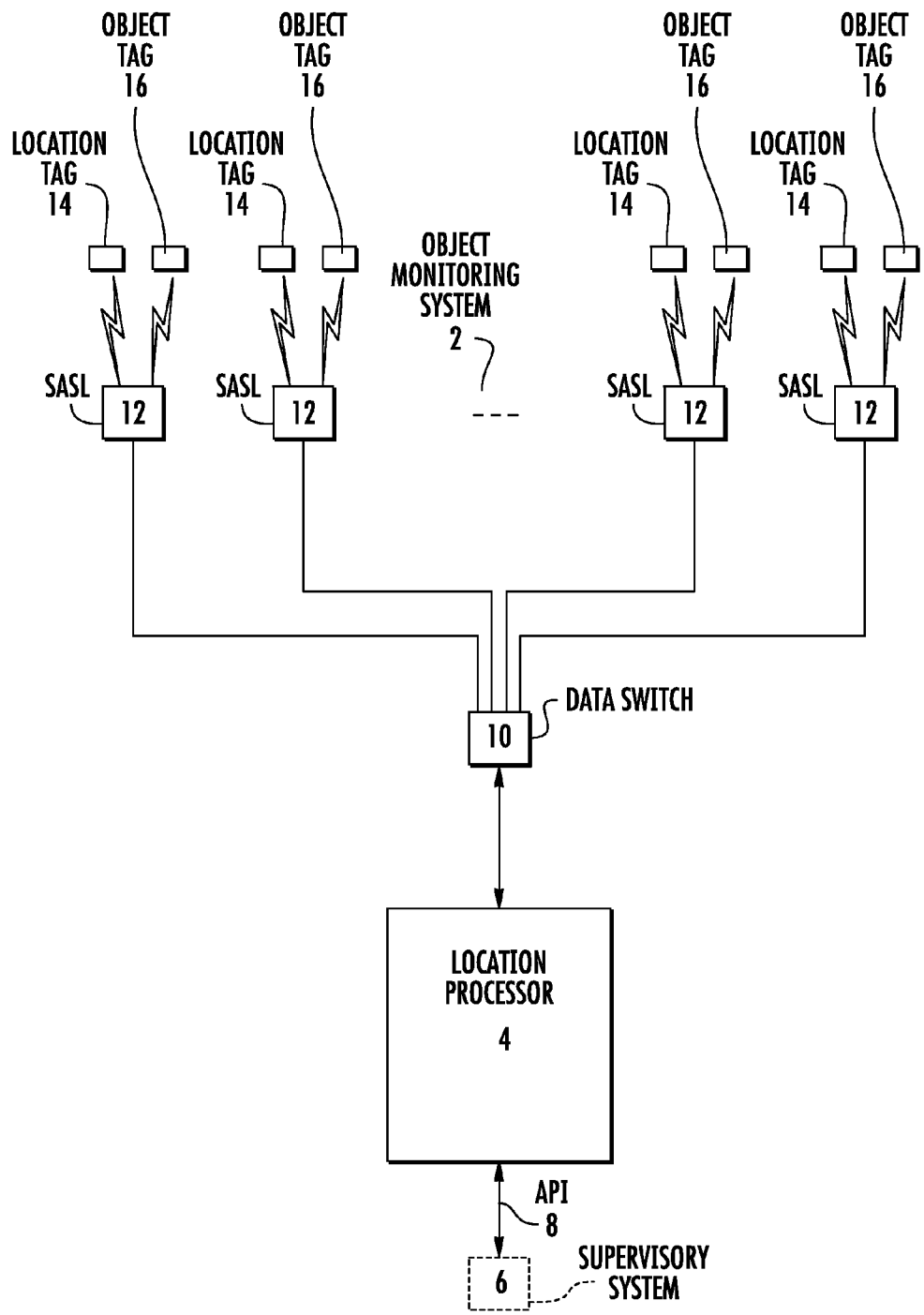
FIG. 1 is a schematic block diagram of a first exemplary object monitoring system.

FIGS. 1-4 show exemplary embodiments of an object monitoring system 2 wherein the object monitoring system is an ITCS (hereafter an ITCS 2). In FIG. 1, a location processor 4 is connected to a supervisory system 6, such as a software application 6, via an Application Programming Interface (API) 8 through which ITCS 2 is managed. A data switch 10, for example a wired or wireless Ethernet data communications switch, connects the Location Processor 4 to each of the SASL(s) 12, which are distributed around the target area 13 being monitored by ITCS 2. A plurality of tags are distributed around the facility, some of which are location tags 14, others of which are object tags 16 attached to objects of interest. A plurality of location data is collected by the SASL(s) regarding the location tags 14 and object tags 16 in the form of location data and object data.

Figure 2:
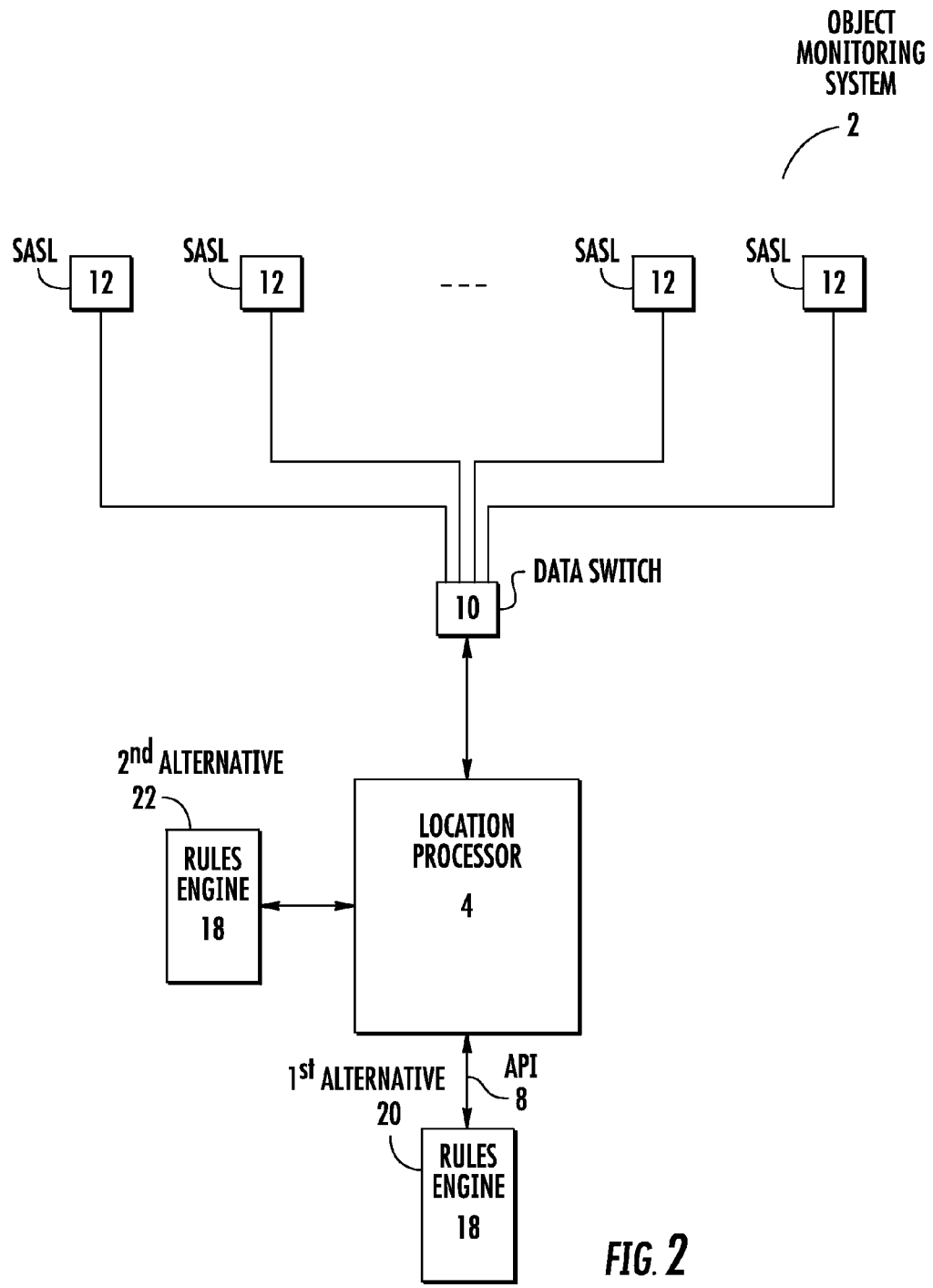
FIG. 2 is a schematic block diagram of a second exemplary object monitoring system with a rules engine.

In FIG. 2, an ITCS 2 is provided with a rules engine 18 that programmatically ascertains the significance of data that is gathered by the distributed SASL(s) 12 under control of the location processor 4. The rules engine 18 logical positioning is demonstrated via a first alternative 20 and a second alternative 22. The first alternative 20 depicts a rules engine 18 (implemented in software) that is external to the location processor 4 and communicates with the location processor 4 via an API 8. The second alternative 22 depicts a rules engine 18 which communicates with the location processor 4 via some other data communications interface other than the API 8 through which the ITCS 2 location processor 4 is managed and by which data is passed, for example, to a software application.

Figure 3:
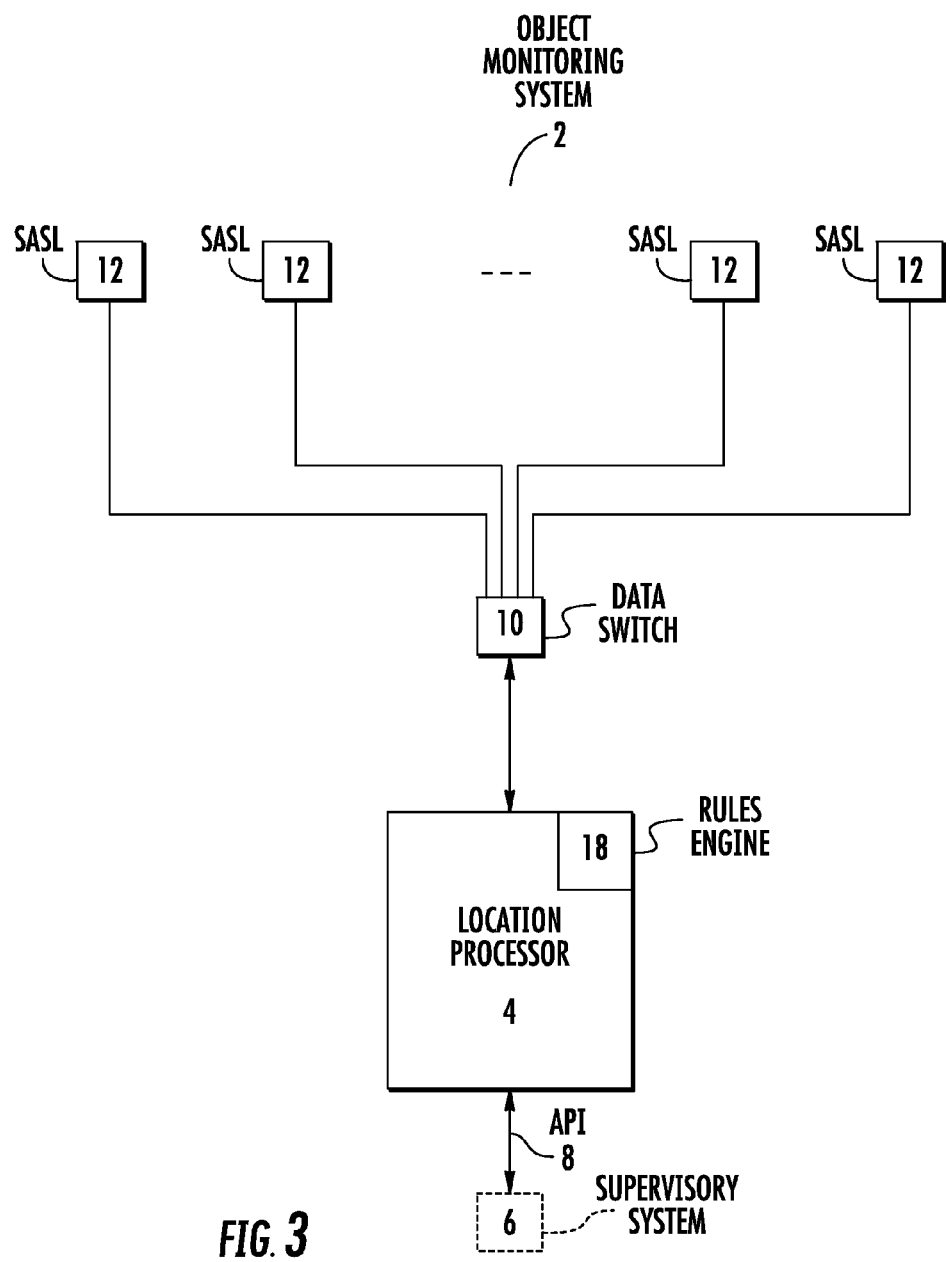
FIG. 3 is a schematic block diagram of a third exemplary object monitoring system with a rules engine embedded in a location processor.

In FIG. 3, an ITCS 2 is provided with a rules engine 18 embedded as an integral component of the location processor 4 as a software, firmware or other processing engine. The rules engine 18 acts to locally interpret the location data gathered by the location processor 4 and intelligently determines an action, response or command based on predetermined rules.

Figure 4:
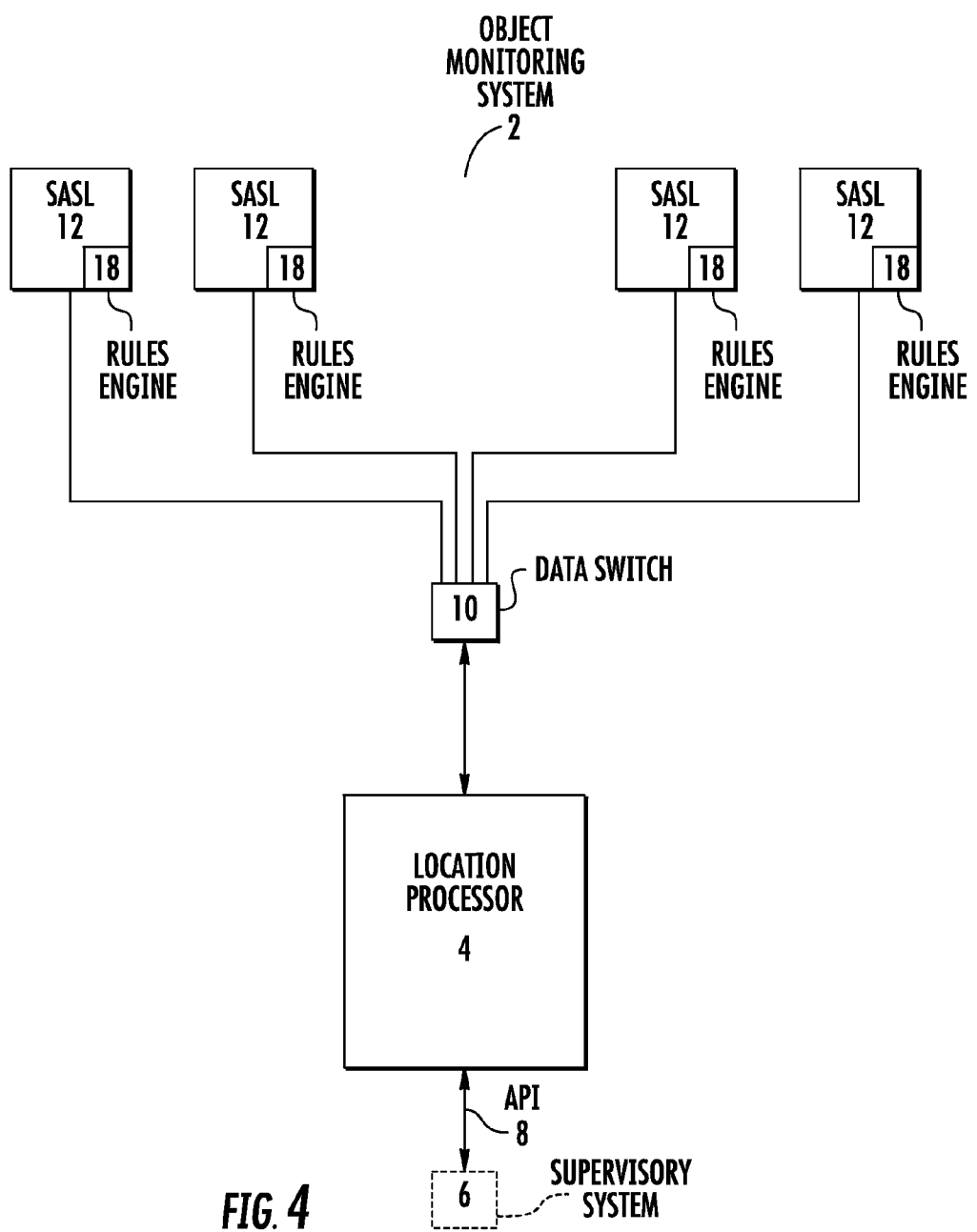
FIG. 4 is a schematic block diagram of a fourth exemplary object monitoring system with a rules engine embedded within and distributed across a plurality of signal acquisition and source location modules.

In FIG. 4, an ITCS 2 is provided with system architecture which pushes more intelligence towards the periphery of the ITCS 2. The rules engine 18 (or a part thereof) is implemented in each of the distributed SASLs 12. In this way, SASLs 12 are provided with a higher degree of autonomy, but this distributed architecture for the rules engine 18 still provides for collation of data into a further rules engine 18 that may logically located as described relative to FIGS. 2 & 3. This provides a form of distributed processing that may be centrally managed or may act autonomously depending on the system configuration.

Figure 5:
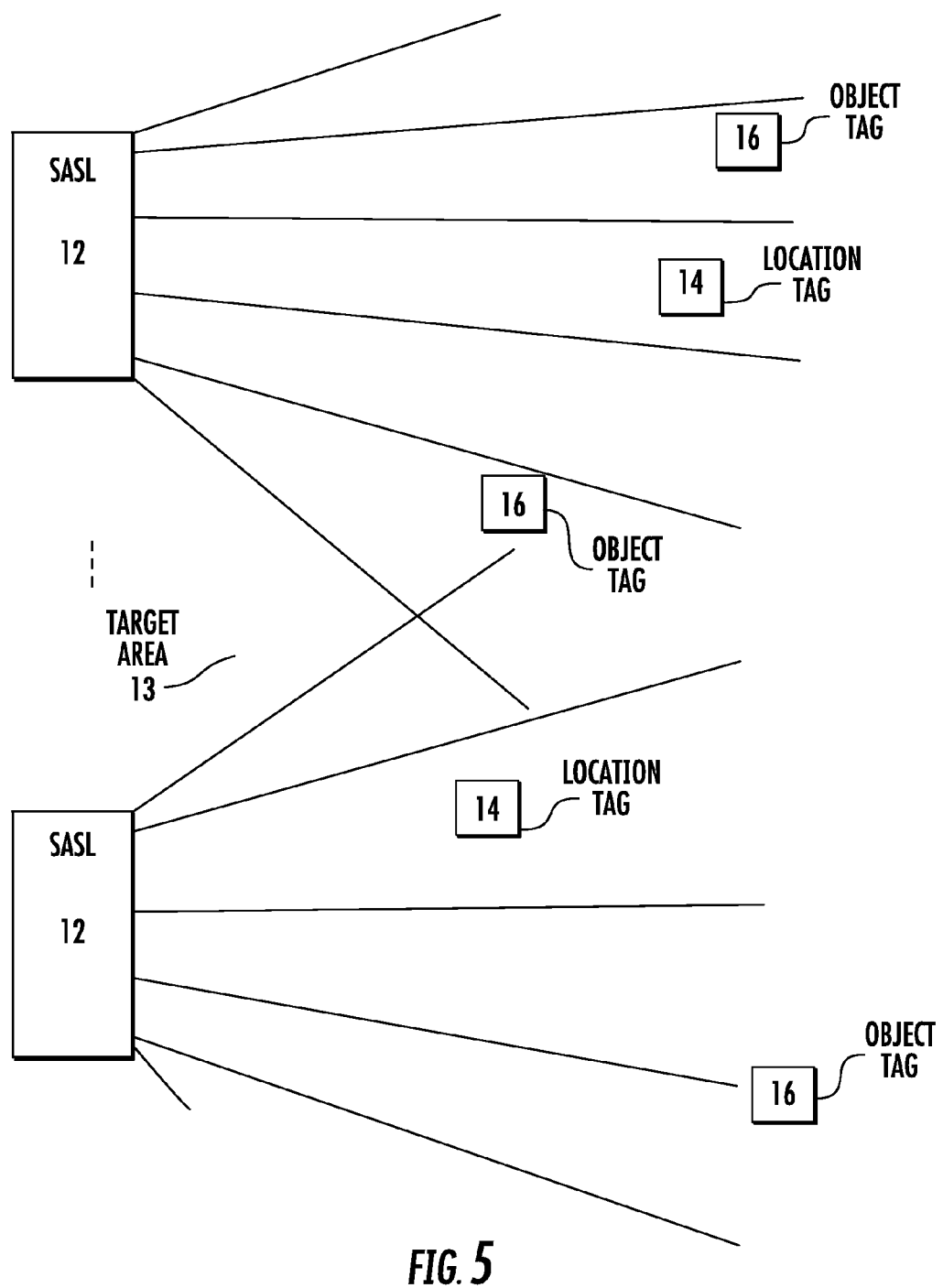
FIG. 5 is a schematic block diagram of the physical layout of an exemplary object monitoring system installation with location tags present in a three dimensional target area.

FIG. 5 shows a representation of a typical ITCS 2 installation, in which the installed location of each of the SASLs 12 is measured using an accurate measuring device, in three dimensions (X,Y,Z) relative to a datum point. Additional data concerning the location and mounting characteristics of each SASL 12 may be recorded and held in a database in the location processor 4, the purpose of said database being to store information pertaining to the calibration and configuration of the ITCS 2 instance.

Location tags 14 are tags which are assigned particular significance in terms of their location. Location tags 14 are typically attached to immovable parts of the infrastructure of the building or target area 13 in which ITCS 2 is installed, to provide pre-identified location and return signal characteristic verified reference points that ITCS 2 can autonomously measure and cross-check against during normal scanning operations.

Similarly, the location of each specially characterized location tag 14 is also measured in three dimensions and the calibration and tag location data is also stored in the aforementioned configuration or calibration database.

Figure 6:
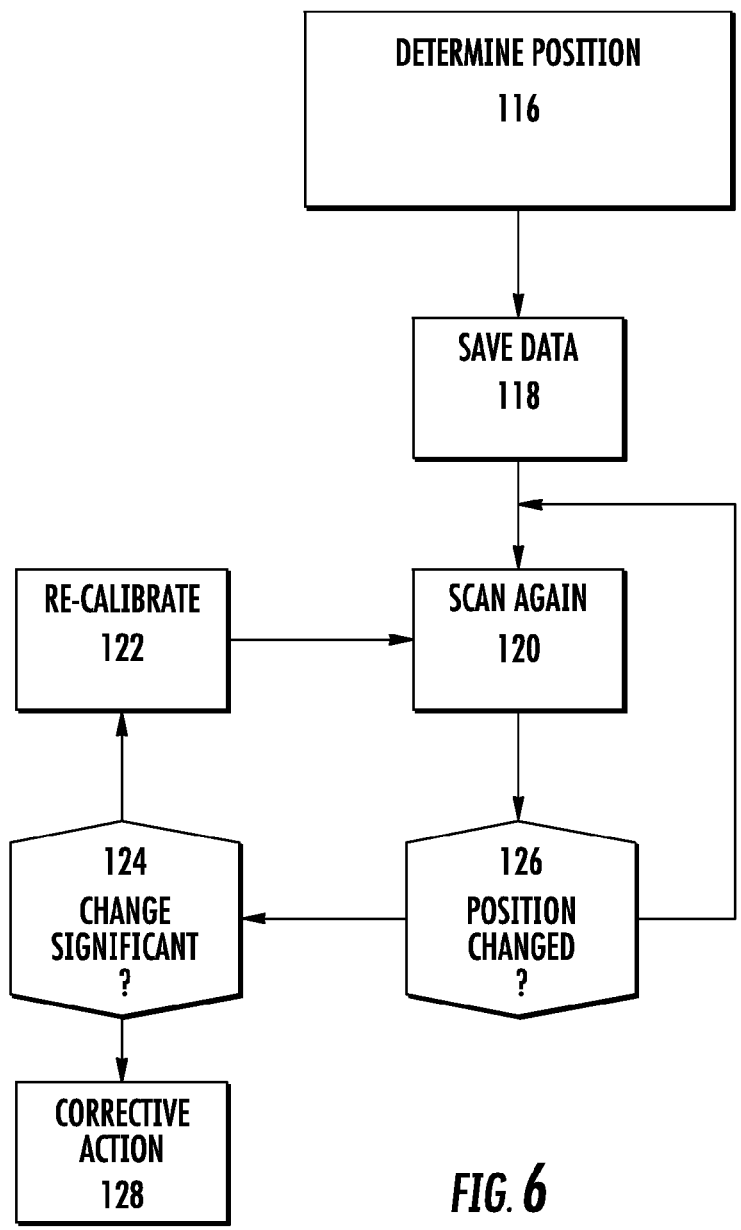
FIG. 6 is a logic flow diagram for re-calibration of an exemplary rules engine based on the scanned location of a plurality of location tags.

FIG. 6 is an exemplar of a processing logic in flow diagram format that may be used by the rules engine 18 in conjunction with an object monitoring system 2, such as an ITCS 2, and or SASL(s) 12. As described herein above, location tags 14 are distributed at accurately measured locations around the facility. The object monitoring system 2 is then enabled to initiate an initial scan of the target area 13, according to the rules engine 18, to determine the position of the location tags 14 at 116. The known locations of the location tags 14 are then saved in the database at 118. The target area 13 is again scanned and location data collected at 120. The object monitoring system 2 determines whether the location tags 14 have remained in their known locations at 126. If all location tags 14 remain in place, the 120 scanning and location data collection process is repeated. If all of the location tags 14 do not remain in place, the rules engine 18 determines whether the error is significant at 124, for example based upon a preset allowable variance level and/or an allowable variance based upon further variance levels as a self-reconfiguration that may be continuous and/or periodically initiated. If the error is determined not to be significant, the object monitoring system 2 re-calibrates itself at 122. In the event that the rules engine 18 determines that the errors are too great for the object monitoring system 2 to be automatically re-calibrated, and therefore significant, for example an indication of a gross mechanical error or equipment failure, the rules engine 18 may raise an alarm so that the error is brought to the attention of an employee wearing an object tag 16 in the form of an employee tag. Corrective action is taken by the employee at 128.

In an exemplary calibration method, here described with respect to an ITCS 2 installation as the object monitoring system 2, RFID location tags 14 are placed in pre-defined fixed positions in the target area 13 to be monitored. This set of fixed location tags 14 can be called a constellation of tags. The exact 3D locations of each of the location tags 14 in the constellation is measured, for example, relative to some datum point in the environment using a precision distance measuring device such as a laser range finder; these measurements of known locations are stored in the ITCS database for reference. This is an important aspect of system calibration or measurement at commissioning, as this information will be used later to form the basis for baseline operation of the object monitoring system 2. Subsequently, ITCS 2 periodically scans the target area 13 and records the real-time determined positions of each of the location tags 14. A rules engine 18 compares the measured, exact known locations as stored in the ITCS database with the subsequent determined positions of the calibration and or location tags 14. The rules engine 18 then provides a number of reports and instructions. Good practice and an exemplary, beneficial application of location tags 14 would be to place such location tags 14 in positions distributed throughout the target area 13 to be monitored ensuring that at least a portion of the location tags 14 are placed towards the extremity of the operating range of a SASL, so that the ITCS system 2 diagnostics circuits and operating system, its firmware or software is able to detect gradual deterioration of performance, which would be indicated, for example, by the "disappearance" of such peripheral location tags 14 from the field of view of a SASL 12.

Representative decisions and actions of the rules engine according to any variances between the historical data and current data in the database are narrated below:

Noting that the location tags 14 are expected to have persistent presence in the field of view of at least one SASL 12, if ITCS 2 determines that no location tags 14 are present, then it assumes that the object monitoring system 2 is not working and raises an alarm for the technical team to undertake repairs or maintenance.

If a substantial percentage of the constellation of location tags 14 has changed position but the relative positions of each of the location tags 14 to each other has remained constant, then the rules engine 18 may for example assume that the mounting hardware or support brackets of one or more of the SASL 12 antennas has been disturbed and execute an automatic re-calibration of the object monitoring system 2 and dynamically update the position fixing algorithms.

If a portion of the location tag 14 positions have changed, then ITCS 2 may for example assume that the environment has changed, such as an electromagnetically reflective or highly absorptive object has been placed in the environment creating a barrier, then the rules engine 18 may be configured to raise an alarm to the user. Alternatively the rules engine 18 may first attempt to re-calibrate its position fixing algorithms to correct for the aberration caused by the change in environment.

If a comparison between the received or backscatter signal strength is made between the original stored value at commissioning and the current scan of the environment, then if the signal strength has deteriorated, then the rules engine 18 may issue a command to a reader engine to undertake a self-diagnostic routine and take corrective action. Storing of and comparison with historical system operating parameters such as signal strength will help to diagnose and correct creeping deterioration in tracking performance or operating range at the fringes or extremes.

The installation of location tags 14 provides anchors that can be used as references to compare the relative positions of moving tags or tags attached to assets or other objects. The anchored characteristic of the location tags 14 may be used to improve the accuracy of positioning of moving tags in a similar way to which a fixed beacon is used to improve the accuracy of GPS (Global Positioning System) in a technique referred to as Differential or Assisted GPS (commonly referred to using the acronyms DGPS and A-GPS respectively). This is particularly relevant where the RF environment changes due to the introduction or removal of objects, vehicles or equipment within the environment being monitored.

A common object identification environment is a warehouse/shipping distribution center with a number of adjacent dock doors. Without special door sensors, it may be difficult for a conventional portal RFID reader system to determine whether a particular door is open or closed and whether an object is moving through or past a particular door. While it is possible to install sensors and instruments in an environment of the type described, these installations and associated communications and/or power wiring require significant additional capital and maintenance resources.

To eliminate the need for door sensors, an ITCS installation may include at least one tag attached to one or each of a plurality of doors in a predetermined position, such that, in the exemplary case of a roller dock door in a distribution centre, as the door is opened the tag rises from the floor towards the top of the opening. Alternatively, if the door to which a location tag has been attached swings on a hinge, then the determined position of such location tag will indicate the state of the door (opened or closed). An intrinsic nature of ITCS is that it automatically observes and monitors the position of the door tag of each door as well as the location of individual tags on items or objects in the vicinity of each of the doors. The rules engine may be configured to recognize an association between an individual door and the items that should be passing through or loaded via a dock door. If a monitored door is opened when it should not be open, or if the inappropriate or incorrect items are passed through the door, then an alert may be generated resulting in some action, which could then be taken by a human or electronic or mechanical device. Furthermore, the determined present location of a particular tag may be used by ITCS to programmatically, through the configurable rules engine, modify its operation.

Figure 7:
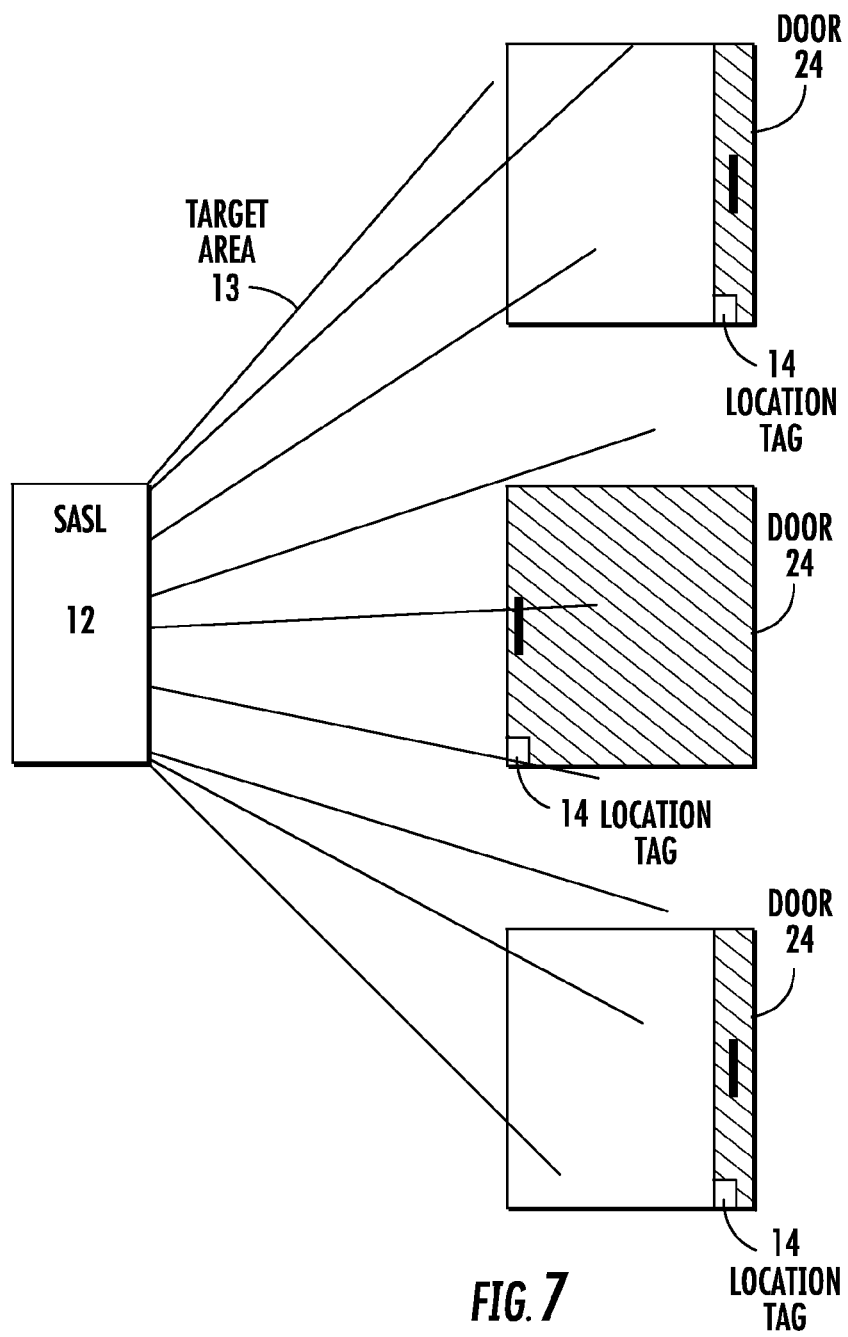
FIG. 7 is a schematic block diagram of the physical layout of an exemplary object monitoring system installation with location tags placed on three doors.

FIG. 7 depicts a representation where one SASL 12 is programmed to scan a target area 13 in which three dock doors 24 are situated, door 24 number 1, door 24 number 2 and door 24 number 3. Location tags 14 are attached to each of the doors 24 in a known location relative to for example the bottom edge of each door 24. The SASL 12 is able to scan all doors 1-3, plus the adjacent staging area through which tagged goods pass on their way from or to the various doors 24. In this exemplary representation, door 24 number 2 is closed. The SASL 12 knows that this is the case so is configured not to scan that area while the door 24 is closed, since no goods can transition a closed door 24. However, the SASL scans the areas of both door 24 number 1 and door 24 number 3. This has the advantage of allowing ITCS 2 and the SASL(s) 12 to dynamically reconfigure their scanning behavior in accordance with the varying positions of the location tags 14, thereby ensuring that optimal scanning behavior is maintained. Note that advantageously with the present invention and ITCS 2, no traditional door sensors or the associated wiring are required to denote whether a door 24 is open or closed. A number of calibration or location tags 14 may also be installed in fixed locations in the general vicinity of each of the doors 24. Should the location accuracy of the door location tags 14 be impaired due to the placement of items or objects in the general area, the SASL 12 or ITCS 2 may use a comparative measurement technique to improve the accuracy of the position of door location tags 14 or object tags 16, by using comparative positioning.

Figure 8:
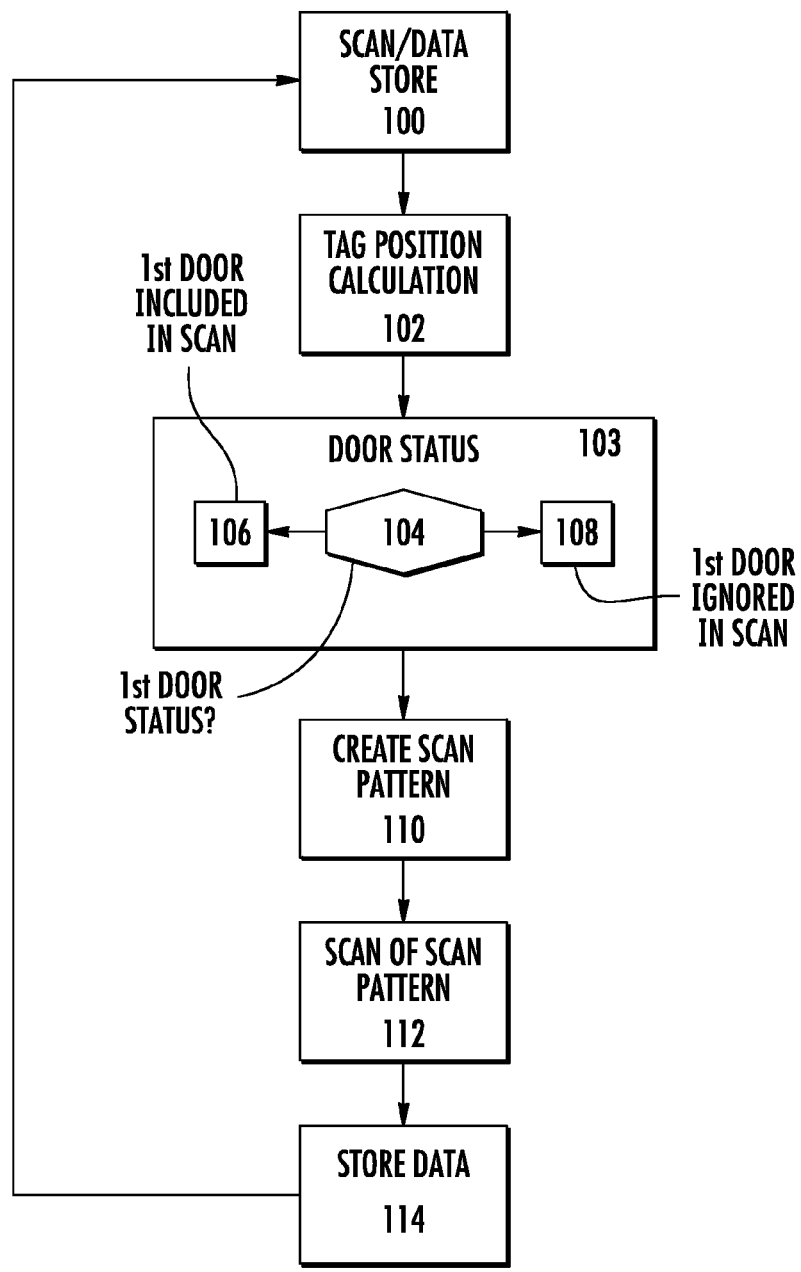
FIG. 8 is a logic flow diagram for an exemplary rules engine for assessing and responding to the status of a plurality of location tags.

FIG. 8 is an exemplary logic flow diagram that a rules engine may execute for assessing the status of location tags. This example relates to the physical environment and circumstances described herein above with respect to FIG. 7. Following the rules engine 18, the object monitoring system 2 first initiates a scan, gathering location data and storing the data in the database at 100. The rules engine 18 then determines the position of the location tags 14 at 102.

Based on the observed position of the location tags 14, the object monitoring system 2 determines whether each of the doors 24 is open or closed at 103. For example, the open or shut state of the first door 24 is reviewed at 104. If the door is open, the door aperture is included within the scan pattern at 106. If the door 24 is not open, the door aperture is not included within the scan pattern at 108. Steps 104, 106 and 108 are then repeated for the remaining doors. Once the status of all doors 24 have been identified, the object monitoring system 2 creates a composite scan pattern at 110. A scan is then initiated to collect data relating to object tags at step 112.

This data is saved in the database at 114. The process is then repeated beginning with a new scan back at 100.

Where objects are passing through doors 24, known passive RFID systems frequently make use of portal readers to determine the identity of object tags 16 or read data from the object tags 16, as they pass through each portal. The nature of known RFID systems means that it is not always possible to determine with an acceptable degree of confidence whether particular object tags 16 are in a particular door 24. Because of propagation conditions that can give rise to what the industry commonly refers to as "spurious reads" or "extraneous reads", it is possible for a reader in door #2 24 to read a tag adjacent to door #1 24 or door #3 24. Such spurious or extraneous reads can result in incorrect business process decisions, because it is possible to misinterpret a spurious tag read, the misinterpretation indicating that a particular object tag 16 (and hence tagged item) is logically and therefore physically associated with the items that are really either being dispatched or received at door #2 24.

In the exemplary dock door 24 case described herein, the rules engine 18 may make a determination based on the location of a location tag 14 placed on the door to cause ITCS 2 to scan or not scan the target area 13 that is defined to cover the aperture of a particular dock door 24 location. This sophisticated adaptive scanning technique is described in WO 2009/035723, Bloy et al. The rules engine 18 may further use the relative position or movement of tags to command ITCS 2 to focus its scanning activity to a much greater extent on a particular target area 13, which might be, for example, the space in or near a door 24 in which some particular object tags 16 may have been detected. Note that this approach to attaching a location tag 14 close to the edge of a door 24 innovatively negates the need to install optical, magnetic or other door status monitoring systems that are intended to indicate to a supervising system whether or not a particular door 24 is opened or closed. A number of fixed location tags 14 may be used as described herein above to improve the positioning accuracy of the door location tag(s) or indeed other tags which may move through the environment by using differential positioning also described herein above.

Note too that it is possible to ascertain whether the door location tag 14 is present or absent as a means of achieving important overall systems diagnostics and maintenance, since, from a practical perspective, it is known that in such operating environments tags may become detached or damaged or deliberately obscured, to the extent that their operation is impaired. ITCS 2 can report such an adverse event so that appropriate action may be taken.

The above description of a distribution center, in which there are multiple adjacent dock doors 24 in various states or conditions, is used only to show an example of the general nature of the present invention. By design and applied variably, through the characteristics of ITCS 2, it is now possible to make use of the precise current location of tags (and by extension the items to which said tags are attached) and to attach business process significance to the current location of said tags with view to either automatically controlling the operation of ITCS 2 to behave in a particular way, or to impart such derived information to a business software application for attention and action. This action, taken in response to an alert, could be conducted by a human, electronic and/or mechanical system. The zonal monitoring and precise location capabilities of ITCS 2 permit the system to provide critical information concerning the absence of a tag, either specific by virtue of its unique code or in general terms, from a predetermined location as an indicator that some action should be taken. By way of further example, in a retail store environment, the disappearance of a tag or plurality of tags from a particular area in which tags are expected to be located (and by extension items to which the tags are attached) may be a material event which traditional RFID systems comprised of portals, nodes or hand-held readers are not able to detect because these traditional systems lack the essential zonal monitoring characteristics of ITCS 2. For example, the shielding of tags from RF excitation signals of a reader or SASL 12 could be an indication that someone has attempted to steal the item to which the tag is attached.

In a second exemplary embodiment, a retail store environment, the ITCS 2 may be deployed to monitor the sales floor. Object tags 16 may be attached to consumer items such as individual pieces of apparel. Because of the large floor area to be covered, a scan takes a finite length of time, due to the limitations imposed by physics, regulatory restrictions, and the communications protocol used by ITCS 2 to gather data wirelessly from distributed RFID tags. When ITCS 2 detects object tags 16 moving relative to location tags 16, the rules engine 18 may command ITCS 2 to change its scanning pattern such that it concentrates on tracking these moving object tags 16. This is particularly relevant when object tags 16 are moving towards the store exit or checkout. The change of scanning focus may be achieved by time slicing between scanning the entire area and scanning the variable locations of the moving object tags 16. If the moving object tags 16 appear to be moving more quickly, the rules engine 18 may command ITCS 2 to devote more of the time to the moving object tags 16 and less time to general scanning. The rules engine 18 may work in an adaptive manner, such that certain pre-determined conditions, such as a value associated with the tagged item and/or a distance of the items location from an external door 24 and/or exit, are used to determine the degree of focus on these items when compared to other lower priority scans.

Clothing presented for sale on the sales floor of an apparel store is typically hung on mobile so-called "Z-Bars", "rounders", "linears", or presented lying flat on gondolas or shelves which may be mounted on castors for mobility. In an exemplary application, a Z-Bar is tagged; this tag conveniently has the same general characteristics as the clothing tags. The clothing on the Z-Bar is also tagged. If the Z-Bar is being moved from the back room to the retail floor, then the clothing tags should move with the asset tag—this is a normal operating procedure. If when the Z-Bar is being moved a tag or tags are separated and go their own way, then it could indicate some form of unauthorized action is taking place—a potentially abnormal inventory management operation.

The rules engine 18 when recognizing a change from the normal environment to some other condition, may modify the system's behavior to take some pre-defined action, such as sounding an alarm, or pointing a CCTV camera at the abnormal environment, or by sending an alert message to a portable device carried by an associate or a member of staff. Note that if a tag is attached to either the portable data capture or communications device carried by an associate for inventory management, or if the associate's employee ID badge is also an RFID tag, then it is possible to locate the position of an associate or associates relative to the location of a detected event in the store. This functionality was not possible to achieve in the past using "passive" RFID tags and conventional object monitoring systems applying "nodal", "spot" or "choke-point" object monitoring. ITCS' tracking and location capability makes these forms of multiple input over varied geography within the target area functionality possible, without adding additional hardware requirements to the object monitoring system 2.

ITCS 2 allows the introduction of "soft" zones. These zones may simply be defined using software tools within the ITCS virtual environment. This does away with the need to provide hardware and software monitoring of doorways, portals or hardware defined zones. This behavior of the tag monitoring infrastructure permits and enables a new art of proactive loss prevention compared with the classic and existing art of loss indication as embodied in Electronic Article Surveillance (EAS) systems typically employed at the exits of retail stores. Such EAS systems are merely an indicator of a likely theft event at a point of egress, which does not indicate the nature or quantity of EAS tagged goods that are probably being stolen. Furthermore, once a stolen item has left a store, it becomes very difficult to apprehend the thief or recover the goods.

The use of ITCS 2 combined with the rules engine 18 provides the functionality for "follow me" systems that may be configured, for example, for theft or loss prevention. The rules engine 18 enables pre-emptive decisions to be automatically performed based on pre-determined process rules. In the example of the Z-Bar the rules engine 18 can analyze the load on the Z-Bar (carrier) on the floor. A series of predetermined rules describe permissible behavior of the carrier and the contents (load). When the behavior exceeds the bounds of permissible behavior, the rules engine may trigger a follow-me behavior in the ITCS or tracking software.

Another use for ITCS 2 combined with the rules engine 18 is in the monitoring of promotional displays and associated display ready inventory, which are placed at various locations around the sales floor with the planned intent of stimulating consumers to purchase goods "on promotion". In this embodiment, one or more of the promotional displays are loaded with promotional items and placed in particular locations around the sales floor. It is well known in retailing that the locations of promotional displays has a critical impact on consumers' buying behavior and hence impacting sales revenue for the store. For example, there is a material difference in the utility of a promotional display when it is located on an end cap of a so-called gondola, or along an aisle between gondolas. The difference between correct placement of a particular promotional display, located in accordance with compliance rules established by the retailer and the consumer goods manufacturer providing said promotional display, and incorrect placement, may be a matter of just a few feet. Hence accuracy of location of tagged promotional displays and associated display ready inventory is of critical importance and value to both the retailer and the consumer goods manufacturer. The inventors observe that known prior art systems for promotions monitoring in retail stores are deficient in one or more areas compared with ITCS 2 and the present invention. The rules engine 18 can monitor the position of the display in relation to fixed location tags, to ensure that the display remains in the correct location or if it is intended to be moved, that the display is moved to the proper location, following the proper route and at the correct time. By monitoring the content of the display, the rules engine 18 can alert store staff to perform a replenishment action before the inventory on the promotional display falls below a critical level.

In another embodiment of the object monitoring system 2, a record may be stored of the signal characteristics (for example received signal strengths and phase, all of which combined form a composite "RF signature") of each of the various fixed location tags 14 that are liberally placed around the shelves in a storeroom. As items are added to the shelves, the RF signature of the location tags 14 attached to the shelves changes. The new signatures may be recorded and stored as described in detailed in U.S. patent application Ser. No.

12/395,595. The aforementioned rules engine 18 may be configured to recognize the varying states of the signatures of the shelf location tags 14, which will change as items with differing dielectric properties are placed on or removed from the proximity of said location tags 14. If the occupancy of a shelf changes, then the RF signatures of tags attached to the shelves change and the rules engine 18 can then generate a report showing for example that inventory is running low, and physical replenishment action may be initiated, further including for example an identification of available assets taskable for the necessary task.

In a further exemplary embodiment, a manufacturing, industrial waste and/or chemical production facility, the handling and storage of materials which are typically stored or transported in containers referred to as intermediate bulk containers (IBCs) may be optimized. The storage and handling of chemicals and industrial waste is regulated by various agencies, authorities and company standard operating procedures, with the intent to ensuring safe storage and accountable handling. An ITCS 2 may be deployed to monitor the arrival, location and departure of tagged drums or other IBCs containing chemicals in a storage facility. It is prescribed that certain chemicals may not be stored in a manner where particular chemicals are co-located with others, and typically some minimum distance between such chemical storage IBCs is specified. Established techniques applied to ascertain arrival, departure or storage location are fallible, since, for example, portal RFID readers provide only monitoring of arrival and departure. Hand-held bar code scanners or portable RFID readers could be employed within the storage facility, but such devices do not confirm the proper location of tagged or bar coded IBCs. An ITCS installation with a dedicated metrics array provides not only the means to automatically monitor the arrival and departure of individual IBCs, but critically can provide the accurate location of such IBCs, so that the aforementioned rules engine 18, provided with the metrics associated with permissible or unacceptable storage or co-location conditions for particular chemicals contained in IBCs, can raise an alert in the event that inappropriate co-location has or will occur, thus ensuring compliance with stipulated safe storage conditions. The use of location tags 14 and environment self-calibration using this invention ensures that the IBCs are precisely located at all times, even under conditions where the RF environment is disturbed by the introduction of goods or items.

One skilled in the art will appreciate that the apparatus and systems disclosed provide significant advantages over prior spot, nodal or choke-point identification based tagged items. Furthermore, the invention when applied to the innovative ITCS 2, adds new multiple input and adaptive reasoning functionality to the tracking and location of RFID tags, hitherto before not possible with known systems.

It will be appreciated by those skilled in the art that the invention is not restricted to the embodiments described herein but it may be applied to other similar applications involving the calibration, operational status verification, tracking, tracing and location of objects or items using RFID tags or other radio frequency transponders.

| Table of Parts | |
|---|---|
| 2 | object monitoring system |
| 4 | location processor |
| 6 | supervisory system |
| 8 | application programming interface |
| 10 | data switch |
| 12 | signal acquisition and source location module |
| 13 | target area |
| 14 | location tags |
| 16 | object tags |
| 18 | rules engine |
| 20 | first alternative |
| 22 | second alternative |
| 24 | door |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A method of rules compliance for an object monitoring system, comprising steps of:
    assigning a value to each of a plurality of object tags;
    the object monitoring system monitoring a relative position of the plurality of object tags in comparison with a position of a plurality of location tags;
    the object monitoring system provided with a set of predetermined rules; the predetermined rules including recognizing the values of the object tags;
    and the object monitoring system initiating an alarm when the object tags move in relation to the location tags according to the predetermined rules; the object monitoring system providing a surveillance response to moving object tags proportional to the values of the object tags; wherein the predetermined rules specify an action when the object tags approach within a predetermined distance from a zone.

2. The method of claim 1, further including monitoring a predetermined distance between designated object tags and initiating a predetermined response upon detection of the predetermined distance that is less than a predetermined value.

* * * * *